DEVICE FOR ADJUSTING PIVOTALLY CONNECTED LEVER ARM OF TELEPHONE ARMS AND THE LIKE

Filed May 25, 1954

3 Sheets-Sheet 1

INVENTOR.
FRANK G. HOLMES
BY
Zoltan H. Polachek
ATTORNEY

INVENTOR.
FRANK G. HOLMES
BY Zoltan H. Polachek
ATTORNEY

June 28, 1955 F. G. HOLMES 2,712,039

DEVICE FOR ADJUSTING PIVOTALLY CONNECTED LEVER ARM OF TELEPHONE ARMS AND THE LIKE

Filed May 25, 1954 3 Sheets-Sheet 3

INVENTOR.
FRANK G. HOLMES
BY
Zoltan H. Polachek
ATTORNEY 2,712,039

DEVICE FOR ADJUSTING PIVOTALLY CONNECTED LEVER ARM OF TELEPHONE ARMS AND THE LIKE

Frank G. Holmes, Philadelphia, Pa.

Application May 25, 1954, Serial No. 432,148

5 Claims. (Cl. 179—150)

This invention relates to pivotally connected lever arms and, more particularly, to a device for locking two such arms at various adjusted angular positions.

It is an object of the present invention to provide a device for locking two pivotally connected lever arms at various adjusted angular positions.

It is another object of the present invention to provide a device for locking two pivotally connected arms in various adjusted angular positions, one arm being connected to a telephone receiver and the other arm being mounted above the telephone base whereby to hold the receiver at a predetermined position, permitting the person using the telephone to employ both hands in turning the pages of a book or holding a pad in one hand and a pencil in the other while carrying on the telephone conversation.

It is another object of the present invention to provide a device for locking two pivotally connected arms in various adjusted angular positions which may be used for toys and other objects where two arms must be held angularly and then adjusted rapidly to a different angle or to a closed position.

It is still another object of the present invention to provide a device for holding a telephone receiver adjacent the user's ear in a comfortable manner and which includes means for closing the telephone push button switches when the receiver is in use and which automatically opens the switches when the conversation is terminated upon rotation of one of the parts.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figures 1, 2, 3, 4:
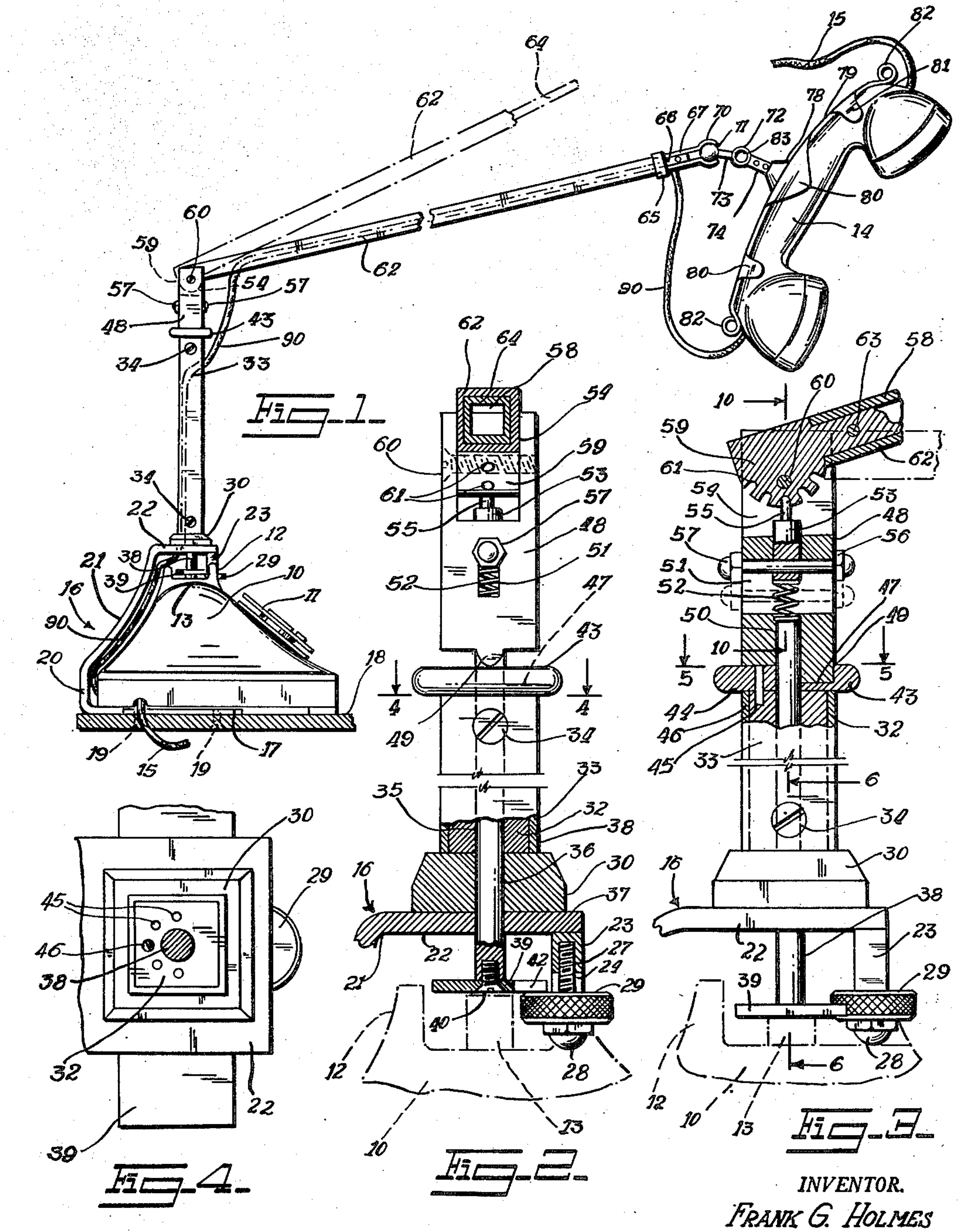
Fig. 1 is a side elevational view of a device embodying the features of the present invention and shown incorporated on a conventional telephone hand set.
Fig. 2 is a fragmentary enlarged side view shown partly in elevation and partly in section and showing the position of the moving parts when the telephone switches are closed.
Fig. 3 is a view similar to Fig. 2, but showing the position of the moving parts when the telephone switches are opened.
Fig. 4 is a top plan view looking along the line 4—4 of Fig. 2.

Referring now more in detail to the figures, 10 represents a conventional telephone base or pedestal having the usual dial 11, cradle 12, push button switches 13 and the telephone receiver and transmitter combination 14 connected to the base 10 by means of the cord 15, all in a manner well known to those skilled in the art.

In the practice of my invention, a bracket 16 is secured along its horizontal base portion 17 to a supporting surface 18 by means of screws 19, the bracket 16 including a vertical portion 20 extending upwardly alongside the bottom of pedestal 10, an upwardly extending, arcuate portion 21 following the contour of the pedestal 10 (Fig. 1) and a top horizontal portion 22 overhanging the cradle 12 and push buttons 13. A vertical plate 23 having a central cutout 24 along its lower edge is secured to the outer edge of the top horizontal portion 22 of clamp 16 by means of screws 25 (Fig. 6), a vertical screw 27 being screw-threaded upwardly into the plate 23 within cutout 24 and having a rounded head 28 adapted to rest on the top of base 10 within the cradle 12 to further support the clamp 16. An enlarged ring 29 having a knurled periphery is keyed onto the screw 27 adjacent the rounded head 28 to facilitate the adjustment of the screw in an obvious manner.

Figures 5, 6, 7:
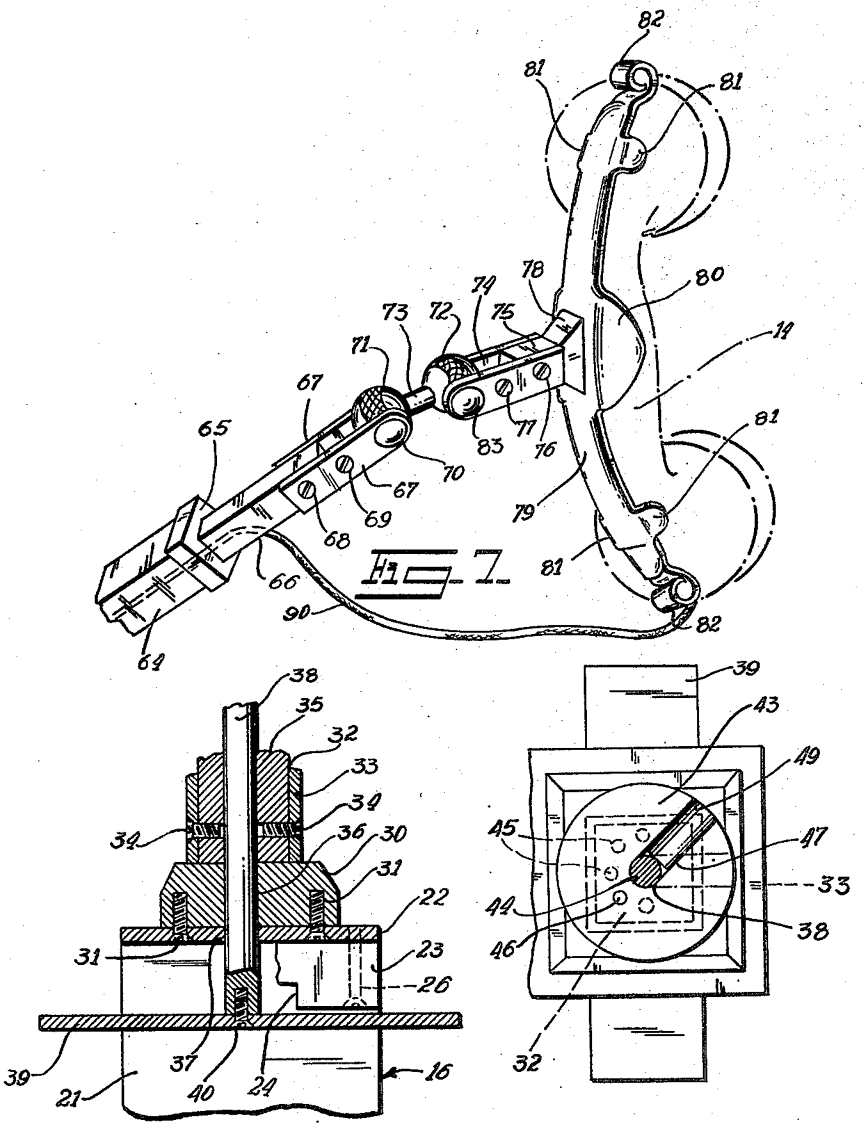
Fig. 5 is a top plan view looking along the line 5—5 of Fig. 3.
Fig. 6 is a fragmentary vertical sectional view taken along the line 6—6 of Fig. 3.
Fig. 7 is an enlarged perspective view of the means for holding the receiver at the end of one of the arms.
Figures 9, 10, 11, 12:
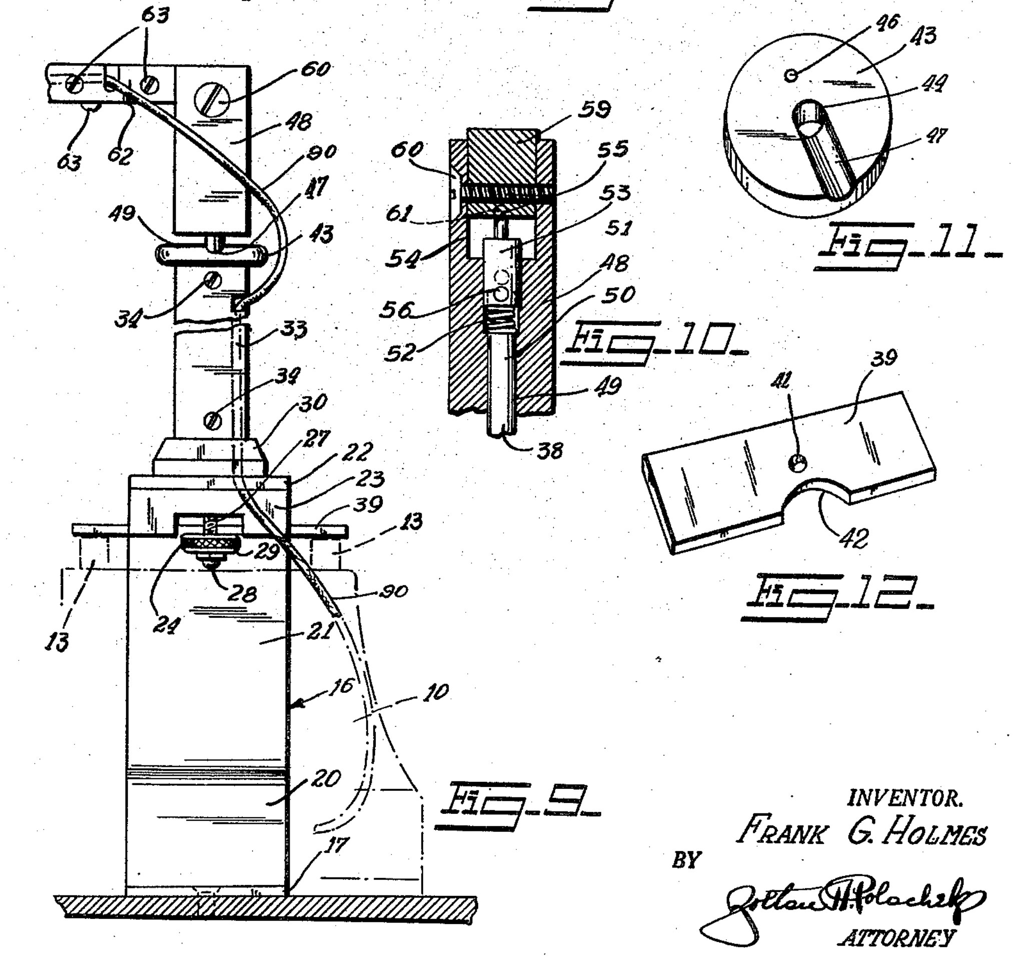
Fig. 9 is a fragmentary front elevational view of the device.
Fig. 10 is a vertical sectional view taken along the line 10—10 of Fig. 3, but showing the detent removed from engagement to permit adjustment of the arm.
Fig. 11 is a perspective view of one of the parts of the device, shown alone.
Fig. 12 is a perspective view of the telephone switch engaging plate, shown alone.

A base or pedestal 30 is secured to the top of the horizontal portion 22 by means of screws 31 (Fig. 6), an upstanding arm 32 of substantially square cross section being suitably secured at its lower end to the top of the pedestal 30. A veneer 33 surrounds the arm 32 on all four sides and is secured thereto by means of screws 34 (Fig. 6). The arm 32 is provided with a central cylindrical longitudinal bore 35 (Fig. 2) extending therethrough, the pedestal 30 and the top portion 22 of clamp 16 being provided with central cylindrical longitudinal bores 36 and 37, respectively, aligned with the bore 35. An elongated shaft 38 is slidably disposed within the bores 35, 36 and 37, the lower end of shaft 38 extending downwardly below the bottom of top portion 22 and having a transverse plate 39 secured thereto by means of a screw 40, the plate 39 being adapted to fit between the cradle corners 12 and to overlie both of the push buttons 13. The plate 39 is provided with an opening 41 at the center thereof which receives the screw 40, the longitudinal edge of plate 39 adjacent the ring 29 having a cutout portion 42 which receives the ring therethrough (Figs. 3 and 2). A disc 43 (Fig. 11) is provided with a central opening 44 which slidably receives the shaft 38 and rests upon the top of the arm 32. The upper end of arm 32 is provided with a plurality of circularly arranged, downwardly extending bores 45 (Fig. 4) adapted to be selectively engaged by a depending pin 46 secured to the undersurface of disc 43. It will be noted that the upper end of shaft 38 extends upwardly through the disc 43. The disc 43 on the upper surface thereof is provided with a radial groove 47 for a purpose which will hereinafter become clear.

A second vertical arm 48 is provided with a central cylindrical longitudinal bore 50 receiving the upwardly extending shaft 38 (Fig. 3), the lower end of arm 48 being formed with a radial ridge 49 adapted to be received within the groove 47 to permit the lower end of arm 48 to rest directly upon the upper face of disc 43. The central portion of arm 48 is provided with a transverse rectangular opening 51 therethrough (Figs. 2, 3 and 10) communicating with central bore 50. A spring 52 rests on the upper end of shaft 38 within bore 50. A foreshortened shaft 53 is slidably disposed within the bore 50 and rests on top of the spring 52. The upper end of arm 48 is provided with a downwardly extending rectangular opening 54 (Figs. 2 and 3), the upper end of shaft 53 extending upwardly into the opening 54 and fixedly carrying a detent 55. A transverse pin 56 pierces the shaft 53 (Fig. 3) and extends outwardly from each side of the arm 48 within the opening 51, the opposite ends of the pin 56 being externally threaded and having screwed thereon heads 57 of greater diameter than the width of the opening 51 (Fig. 2). Thus, by grasping the heads 57, the shaft 53 may be moved downwardly against the action of spring 52 for a purpose which will hereinafter become clear.

An arm 58 (Fig. 3) having a semicircular enlargement 59 is pivotally mounted within the opening 54 by means of a bolt 60, the semicircular enlargement 59 overlying the detent 55 and being provided around its periphery with a plurality of radially spaced openings 61 adapted to selectively receive therein the detent 55 whereby to lock the angular position of the arm 58 relative to the arms 48 and 32 (Fig. 3). This angulation may, of course, be changed by holding the heads 57 between the fingers and pressing downwardly to remove the detent 55 from the particular opening 61 in which it rests, as shown in dotted outline in Fig. 3.

Figure 8:
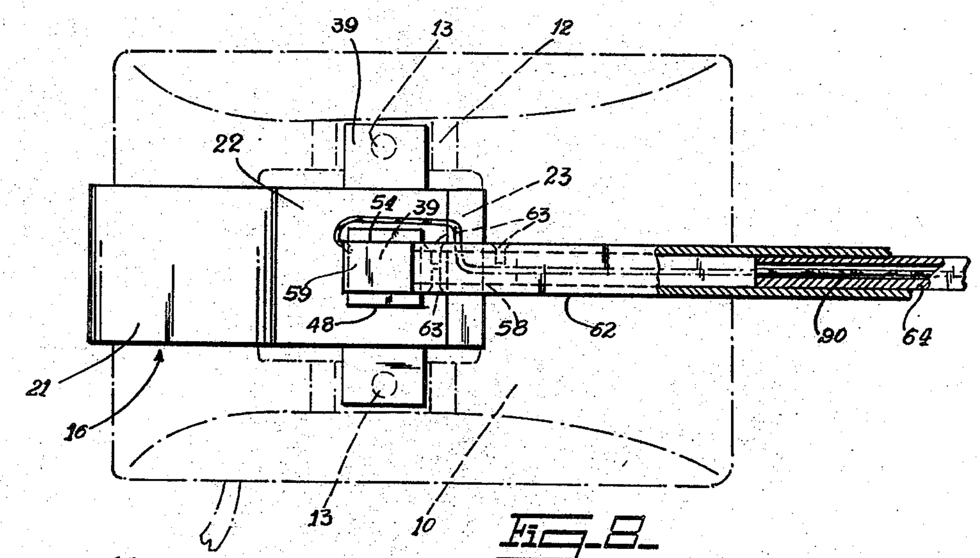
Fig. 8 is a top plan view of the device shown partly in section.

A hollow elongated rectangular tube 62 is mounted on the arm 58 and secured thereto by means of screws 63 (Fig. 8), the outer end of the tube 62 telescopically receiving therewithin a second rectangular elongated tube 64. The outer end of tube 62 has secured thereto an enlarged block 65 which serves to mount the rectangular bar 66 (Fig. 7) and to limit the inward displacement of tube 62.

A pair of complementary, elongated brackets 67 are secured to opposite sides of bar 66 at its outer end by means of screws 68, the brackets 67 being further connected beyond the end of the bar 66 by means of screws 69 and being integrally formed at their outer ends with convex portions 70 between which are mounted for universal movement the ball 71 (Fig. 7). The ball 71 is connected to a second ball 72 by means of a rod 73, the ball 72 being similarly mounted between the convex portions 83 of a pair of a second pair of complementary brackets 74 secured to the opposite sides of a block 75 by means of screws 76. The brackets 74 are further secured together intermediate the block 75 and ball 72 by means of screws 77. The outer end of the block 75 is integrally formed with a mounting base or outwardly flared portion 78 which is suitably secured to an arcuate strip 79 adapted to snugly engage the back of the receiver 14 and secured thereto by means of central clamping portions 80 and end clamping portions 81 (Fig. 7). The opposite ends of the strips 79 are rolled back upon themselves for ornamental effect, as at 82. Thus, the receiver 14 is firmly secured to the strip 79 by means of the clamping portions 80 and 81.

Thus, the arms 48 and 58 may be locked in various adjusted angular positions relative to each other and then, if desired, adjusted rapidly to a different angle with a minimum of effort. While these arms have been shown attached to the telephone base 10 and a receiver 14, it will be readily apparent to those skilled in the art that the two arms and connecting means shown may be used for toys and other objects wherever two arms must be held angularly and then adjusted rapidly to a different angle or to a closed position without departing from the spirit and scope of the invention.

Normally, the ridge 49 will rest within the groove 47 (Fig. 3), the pressure of spring 52 downwardly upon shaft 38 when the lower end of arm 48 rests on the top of disc 43 being sufficient to retain the push button switches 13 in the open position. The angular disposition of the arm 48 about a vertical axis may be set by lifting the disc 43 upwardly and selectively engaging the pin 46 thereof with the openings 45 in the top of arm 32, to facilitate and permit the proper angulation of the device about a vertical axis after the bracket 16 has been secured to the supporting surface 18. The height of the receiver 14 may be then controlled by the detent 55 which is selectively received within the openings 61 of the enlargement 59, it being only necessary to move the heads 57 downwardly to remove the detent from one position and to set it in another. The distance of the receiver 14 from the base 10 may be adjusted by the telescopic arms 62, 64, as will be obvious. Finally, for the user's complete comfort, the receiver 14 may be rotated in a double universal manner adjacent the user's ear by means of the balls 71 and 72 and their respective socket connections, actually permitting the receiver 14 to be adjusted with the same freedom and comfort as if the same were actually held in the hand.

When the telephone rings and it is desired to close the switches 13, it is only necessary to move the arm 48 upwardly to withdraw the ridge 49 from groove 47 and upon angular rotation of the arm 48 to permit the ridge 49 to rest on the top surface of disc 43 (Fig. 2). This permits the shaft 38 to move upwardly since the compression of spring 52 is reduced, permitting the upwardly urged switches 13 to rise to their closed position. As long as the ridge 49 remains displaced from the groove 47, the switches 13 will be closed and the conversation may be continued. When the conversation is finished, the ridge 49 will again be rotated back into the groove 47, bringing the arm 48 downwardly and further compressing the spring 52 which moves the shaft 38 and plate 39 downwardly to open switches 13 (Fig. 3). Further adjustment may be effected by means of the ring 29 and the screw 27.

The electric wires 90 are shown to be within the arms 32 and 58 except at their pivoted joining ends where loops are provided for free turning of the said arms.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. The combination with a telephone base having push button switches adapted to be normally retained open by a telephone receiver resting thereon, of a fixed bracket having a substantially horizontal portion overhanging the switches, a first substantially vertical arm mounted on said horizontal portion, a second vertical arm, means for mounting said second arm on top of said first arm in a plurality of angularly adjustable positions about a substantially vertical axis, a third arm pivotally connected to the top of said second arm, means for locking the position of said third arm relative to said second arm in a plurality of angularly adjustable positions, means for mounting the telephone receiver at the outer end of said third arm, and means for opening and closing the telephone switches controlled by the angular position of said second vertical arm, said means for locking the position of said third arm relative to said second arm comprising said second arm at the top end thereof having a downwardly extending slot, an arcuate enlargement at one end of said third arm, said enlargement being pivotally connected to said second arm within said slot with the arcuate portion of said enlargement disposed downwardly, said second arm having a longitudinal bore communicating with said slot, and spring detent means within said bore, said enlargement around its arcuate periphery having a plurality of radially spaced openings adapted to selectively receive said spring detent means therewithin whereby to lock the angular position of said third arm relative to said second arm in a plurality of angularly adjustable positions.

2. The combination with a telephone base having push button switches adapted to be normally retained open by a telephone receiver resting thereon, of a fixed bracket having a substantially horizontal portion overhanging the switches, a first substantially vertical arm mounted on said horizontal portion, a second vertical arm, means for mounting said second arm on top of said first arm in a plurality of angularly adjustable positions about a substantially vertical axis, a third arm pivotally connected to the top of said second arm, means for locking the position of said third arm relative to said second arm in a plurality of angularly adjustable positions, means for mounting the telephone receiver at the outer end of said third arm, means for opening and closing the telephone switches controlled by the angular position of said second vertical arm, said means for locking the position of said third arm relative to said second arm comprising said second arm at the top end thereof having a downwardly extending slot, an arcuate enlargement at one end of said third arm, said enlargement being pivotally connected to said second arm within said slot with the arcuate portion of said enlargement disposed downwardly, said second arm having a longitudinal bore communicating with said slot, spring detent means within said bore, said enlargement around its arcuate periphery having a plurality of radially spaced openings adapted to selectively receive said spring detent means therewithin whereby to lock the angular position of said third arm relative to said second arm in a plurality of angularly adjustable positions, said means for mounting said second arm on top of said first arm comprising said second arm, longitudinal bore extending downwardly therethrough, said first arm having a central longitudinal bore aligned with said second arm bore, an elongated shaft within said aligned bores extending from said spring detent means downwardly into said first arm, a rotatable plate on said elongated shaft intermediate said first and second arms, and a depending pin fixedly carried by said plate, the upper end of said first arm having a plurality of circularly disposed openings adapted to selectively receive said pin, said plate being keyed to the lower end of said second arm.

3. The combination with a telephone base having push button switches adapted to be normally retained open by a telephone receiver resting thereon, of a fixed bracket having a substantially horizontal portion overhanging the switches, a first substantially vertical arm mounted on said horizontal portion, a second vertical arm, means for mounting said second arm on top of said first arm in a plurality of angularly adjustable positions about a substantially vertical axis, a third arm pivotally connected to the top of said second arm, means for locking the position of said third arm relative to said second arm in a plurality of angularly adjustable positions, means for mounting the telephone receiver at the outer end of said third arm, means for opening and closing the telephone switches controlled by the angular position of said second vertical arm, said means for locking the position of said third arm relative to said second arm comprising said second arm at the top end thereof having a downwardly extending slot, an arcuate enlargement at one end of said third arm, said enlargement being pivotally connected to said second arm within said slot with the arcuate portion of said enlargement disposed downwardly, said second arm having a longitudinal bore communicating with said slot, spring detent means within said bore, said enlargement around its arcuate periphery having a plurality of radially spaced openings adapted to selectively receive said spring detent means therewithin whereby to lock the angular position of said third arm relative to said second arm in a plurality of angularly adjustable positions, said means for mounting said second arm on top of said first arm comprising said second arm, longitudinal bore extending downwardly therethrough, said first arm having a central longitudinal bore aligned with said second arm bore, an elongated shaft within said aligned bores extending from said spring detent means downwardly into said first arm, a rotatable plate on said elongated shaft intermediate said first and second arms, a depending pin fixedly carried by said plate, the upper end of said first arm having a plurality of circularly disposed openings adapted to selectively receive said pin, said plate being keyed to the lower end of said second arm, said means for opening and closing the telephone switches comprising said elongated shaft extending downwardly through said horizontal portion of said bracket, an elongated plate secured to the bottom of said elongated shaft and adapted to open the switches upon downward movement, said plate on the upper surface thereof having a radial groove, and a radial ridge on the lower end of said second arm adapted to be received within said radial groove, said spring detent means including a spring adapted to close the switches when said ridge is within said groove and to permit the opening of the switches when said ridge is displaced from said groove.

4. The combination with a telephone base having push button switches adapted to be normally retained open by a telephone receiver resting thereon, of a fixed bracket having a substantially horizontal portion overhanging the switches, a first substantially vertical arm mounted on said horizontal portion, a second vertical arm, means for mounting said second arm on top of said first arm in a plurality of angularly adjustable positions about a substantially vertical axis, a third arm pivotally connected to the top of said second arm, means for locking the position of said third arm relative to said second arm in a plurality of angularly adjustable positions, means for mounting the telephone receiver at the outer end of said third arm, means for opening and closing the telephone switches controlled by the angular position of said second vertical arm, said means for mounting the telephone at the outer end of said third arm comprising an elongated hollow tube secured to said third arm, a second elongated hollow tube telescopically received on said first tube, universal joint means at the outer end of said second tube, a bracket secured to the telephone receiver, and second universal joint means connected to said bracket, said universal joint means being connected to said first universal joint means.

5. The combination with a telephone base having push button switches adapted to be normally retained open by a telephone receiver resting thereon, of a fixed bracket having a substantially horizontal portion overhanging the switches, a first substantially vertical arm mounted on said horizontal portion, a second vertical arm, means for mounting said second arm on top of said first arm in a plurality of angularly adjustable positions about a substantially vertical axis, a third arm pivotally connected to the top of said second arm, means for locking the position of said third arm relative to said second arm in a plurality of angularly adjustable positions, means for mounting the telephone receiver at the outer end of said third arm, means for opening and closing the telephone switches controlled by the angular position of said second vertical arm, said means for locking the position of said third arm relative to said second arm comprising said second arm at the top end thereof having a downwardly extending slot, an arcuate enlargement at one end of said third arm, said enlargement being pivotally connected to said second arm within said slot with the arcuate portion of said enlargement disposed downwardly, said second arm having a longitudinal bore communicating with said slot, spring detent means within said bore, said enlargement around its arcuate periphery having a plurality of radially spaced openings adapted to selectively receive said spring detent means therewithin whereby to lock the angular position of said third arm relative to said second arm in a plurality of angularly adjustable positions, said means for mounting said second arm on top of said first arm comprising said second arm, longitudinal bore extending downwardly therethrough, said first arm having a central longitudinal bore aligned with said second arm bore, an elongated shaft within said aligned bores extending from said spring detent means downwardly into said first arm, a rotatable plate on said elongated shaft intermediate said first and second arms, a depending pin fixedly carried by said plate, the upper end of said first arm having a plurality of circularly disposed openings adapted to selectively receive said pin, said plate being keyed to the lower end of said second arm, said means for opening and closing the telephone switches comprising said elongated shaft extending downwardly through said horizontal portion of said bracket, an elongated plate secured to the bottom of said elongated shaft and adapted to open the switches upon downward movement, said plate on the upper surface thereof having a radial groove, a radial ridge on the lower end of said second arm adapted to be received within said radial groove, said spring detent means including a spring adapted to close the switches when said ridge is within said groove and to permit the opening of the switches when said ridge is displaced from said groove, a depending plate on the outer edge of said horizontal portion, said plate along its lower edge having a cutout portion, a screw screw-threaded upwardly within said cutout, said screw having a rounded head adapted to rest on the top of the telephone base as a support for said horizontal portion, and an enlarged, manually operable ring keyed onto said screw adjacent said head whereby to vary the distance of said head from said horizontal portion.

References Cited in the file of this patent

UNITED STATES PATENTS

| | | |
|---|---|---|
| 779,504 | Seifried | Jan. 10, 1905 |
| 2,435,816 | Anderson | Feb. 10, 1948 |
| 2,657,278 | Le Noir | Oct. 27, 1953 |